(12) United States Patent
Goodrich et al.

(10) Patent No.: US 9,376,101 B2
(45) Date of Patent: Jun. 28, 2016

(54) ALL-WHEEL DRIVE TORQUE VECTORING BY ELECTRONIC BRAKE SYSTEM CONTROL

(71) Applicant: Continental Automotive Systems, Inc., Auburn Hills, MI (US)

(72) Inventors: Daniel Gregory Goodrich, Cedarville, MI (US); Adam Roger Pagot, Sault Ste. Marie (CA); Matthew Conrad Tuhro, Sault Ste. Marie, MI (US); Vesa Vihelm Luomaranta, Sault Ste. Marie (CA); Ryan Wayne Alaspa, Sault Ste. Marie, MI (US); Timothy John Hayden, Sault Ste. Marie, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 64 days.

(21) Appl. No.: 14/470,263

(22) Filed: Aug. 27, 2014

(65) Prior Publication Data
US 2015/0065299 A1   Mar. 5, 2015

Related U.S. Application Data

(60) Provisional application No. 61/781,144, filed on Aug. 28, 2013.

(51) Int. Cl.
*B60W 10/04* (2006.01)
*B60W 10/184* (2012.01)
(Continued)

(52) U.S. Cl.
CPC ............ *B60W 10/184* (2013.01); *B60T 8/1755* (2013.01); *B60T 8/1769* (2013.01); *B60T 8/26* (2013.01); *B60T 8/322* (2013.01); *B60W 10/06* (2013.01); *B60W 10/14* (2013.01); *B60W 10/16* (2013.01); *B60W 30/045* (2013.01); *B60T 2270/302* (2013.01); *B60T 2270/303* (2013.01); *B60W 30/18145* (2013.01); *B60W 2050/0091* (2013.01); *B60W 2050/0094* (2013.01); *B60W 2520/10* (2013.01); *B60W 2520/105* (2013.01); *B60W 2520/125* (2013.01); *B60W 2520/14* (2013.01); *B60W 2520/28* (2013.01);
(Continued)

(58) Field of Classification Search
CPC ............ Y10T 447/87; Y10T 477/816; B60W 10/184; B60W 10/04; B60W 30/18145; B60W 2520/14; B60T 8/1755; B60T 8/1769; B60T 8/322; B60T 8/26; B60T 2270/303; B60T 2270/302
USPC .............. 701/72, 79, 81–84, 87–89; 477/203, 477/186; 180/244
See application file for complete search history.

(56) References Cited

U.S. PATENT DOCUMENTS 6,321,144 B1   11/2001   Crombez
7,267,628 B2   9/2007    Bowen
(Continued)

*Primary Examiner* — Roger Pang

(57) ABSTRACT

A control system to generate a yaw torque of an all-wheel drive vehicle comprises a brake control module 18. The brake control module 18 determines the desired powertrain torque 44 for the vehicle 10 based upon a plurality of factors including available torque from the powertrain. The brake control module 18 determines a first torque 44 and a second torque 26, wherein the first torque 44 and the second torque 26 are combined to provide the total desired yaw torque 49 of the vehicle 10. The first torque 44 is generated between wheels of the vehicle 10 by applying torque 44 from the powertrain 14 to different wheels 21 of the vehicle 10 and the second torque 26 is generated by applying different braking torque from a braking system 16 of the vehicle 10.

18 Claims, 2 Drawing Sheets

(51) Int. Cl.
- *B60T 8/26* (2006.01)
- *B60T 8/32* (2006.01)
- *B60T 8/1755* (2006.01)
- *B60T 8/1769* (2006.01)
- *B60W 10/06* (2006.01)
- *B60W 10/14* (2012.01)
- *B60W 10/16* (2012.01)
- *B60W 30/045* (2012.01)
- *B60W 30/18* (2012.01)
- *B60W 50/00* (2006.01)

(52) U.S. Cl.
CPC ........ *B60W2540/18* (2013.01); *B60W 2720/14* (2013.01); *B60W 2720/403* (2013.01); *B60W 2720/406* (2013.01); *B60Y 2300/82* (2013.01); *Y10T 477/816* (2015.01); *Y10T 477/87* (2015.01)

(56) References Cited

U.S. PATENT DOCUMENTS

| | | |
|---|---|---|
| 7,617,902 B2 | 11/2009 | Perakes et al. |
| 7,793,749 B2 | 9/2010 | Baasch et al. |
| 2002/0075139 A1* | 6/2002 | Yamamoto ............ B60R 21/013 340/436 |
| 2003/0102713 A1* | 6/2003 | Murakami ............ B60T 8/1755 303/146 |
| 2004/0117099 A1* | 6/2004 | Inagaki ................ B60T 8/1755 701/70 |
| 2006/0091727 A1* | 5/2006 | Motoyama ............ B60K 17/20 303/189 |
| 2006/0162981 A1* | 7/2006 | Kurosawa ........... B60K 17/3462 180/249 |
| 2007/0112497 A1* | 5/2007 | Miura .................... B60T 8/1755 701/70 |
| 2007/0112499 A1* | 5/2007 | Matsuno ............. B60W 10/119 701/93 |
| 2007/0265758 A1* | 11/2007 | Miura .................... B60T 8/1755 701/72 |
| 2008/0183353 A1* | 7/2008 | Post .................... B60G 17/0165 701/42 |
| 2008/0221766 A1* | 9/2008 | Maeda .................. B60T 8/1755 701/70 |
| 2009/0018741 A1* | 1/2009 | Miura .................... B60T 8/1755 701/72 |
| 2009/0037053 A1* | 2/2009 | Yamazaki ............. B60K 23/04 701/41 |
| 2009/0236905 A1* | 9/2009 | Maeda .................. B60T 8/1755 303/146 |
| 2013/0179015 A1* | 7/2013 | Liang .................... B60W 10/08 701/22 |

* cited by examiner

ALL-WHEEL DRIVE TORQUE VECTORING BY ELECTRONIC BRAKE SYSTEM CONTROL

CROSS-REFERENCE TO RELATED APPLICATIONS

This disclosure claims priority to U.S. Provisional Application No. 61/871,144, which was filed on Aug. 28, 2013 and is incorporated herein by reference.

TECHNICAL FIELD

The present disclosure relates to vehicles and more particularly to torque vectoring for vehicles.

BACKGROUND

Torque vectoring is to create vehicle yaw torque while driving in turns to improve vehicle stability and handling. It is desirable to provide a vehicle torque vectoring system to reduce vehicle understeer and oversteer characteristics while driving in turns. Torque vectoring is achieved by creating a yaw torque on a vehicle. The electronic brake system (EBS) offers a brake-based torque vectoring system that provides differential torque application via brake torque control at the inner and outer wheels. The all wheel drive (AWD) system offers a powertrain-based torque vectoring system that provides differential torque application at the inner and outer wheels. The differential torque application at the inner and the outer wheels creates the vehicle yaw toque. Brake-based torque vectoring provides the ability to torque vector on all four wheels, on any axle, including un-driven axles, and during off-throttle and no or low powertrain torque conditions. Powertrain based torque vectoring provides the ability to torque vector on any wheel with powertrain torque applied.

Providing torque vectoring from two different systems may result in a requirement to choose between brake and powertrain-based torque vectoring. The two different torque vectoring systems are typically purchased, developed, calibrated and validated separately from one another.

SUMMARY

A control system for an AWD vehicle comprises a powertrain system configured to provide a desired powertrain torque differential to inner wheels and outer wheels and a brake system configured to apply a differential braking torque to the inner wheels and outer wheels. A brake control module controls the differential torque provided by the powertrain system and the differential braking torque.

A method of generating a yaw torque in an all-wheel drive vehicle comprises requesting a value representing an available torque from a powertrain for the vehicle, determining a desired yaw torque for the vehicle with a brake control module, and determining a first torque differential and a second torque differential, wherein the first torque differential and the second torque differential are combined to provide the desired yaw torque of the vehicle. The first torque differential between wheels of the vehicle is generated by applying torques from a powertrain to different wheels of the vehicle and the second torque differential between the wheels of the vehicle is generated by applying different braking torques from a braking system of the vehicle.

A brake control module for controlling a brake system of an all-wheel drive vehicle, the controller comprising instructions to generate a yaw torque in the vehicle. The brake control module requests a value from an available torque from the powertrain of the vehicle. The brake control module determines the desired yaw torque for the vehicle based upon a plurality of factors. The brake control module determines a first torque and a second torque, wherein the first torque and the second torque are combined to provide the desired yaw torque of the vehicle. The first torque is generated between wheels of the vehicle by applying torque from the powertrain to different wheels of the vehicle. The second torque is generated by applying different braking torques from the braking system of the vehicle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
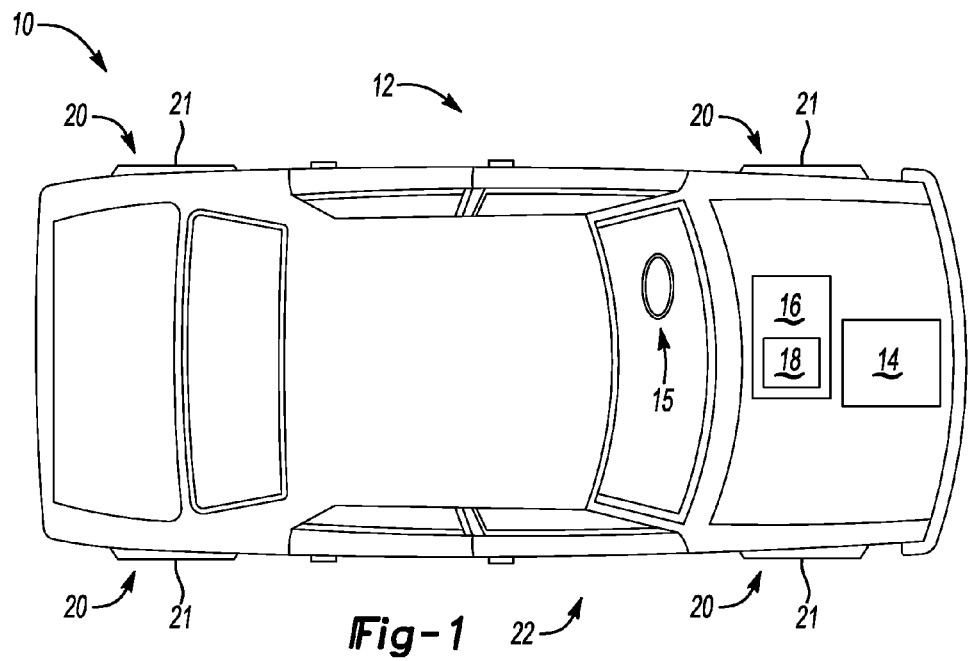
FIG. 1 is a schematic illustration of a vehicle having torque vectoring of the present invention.
Figure 2:
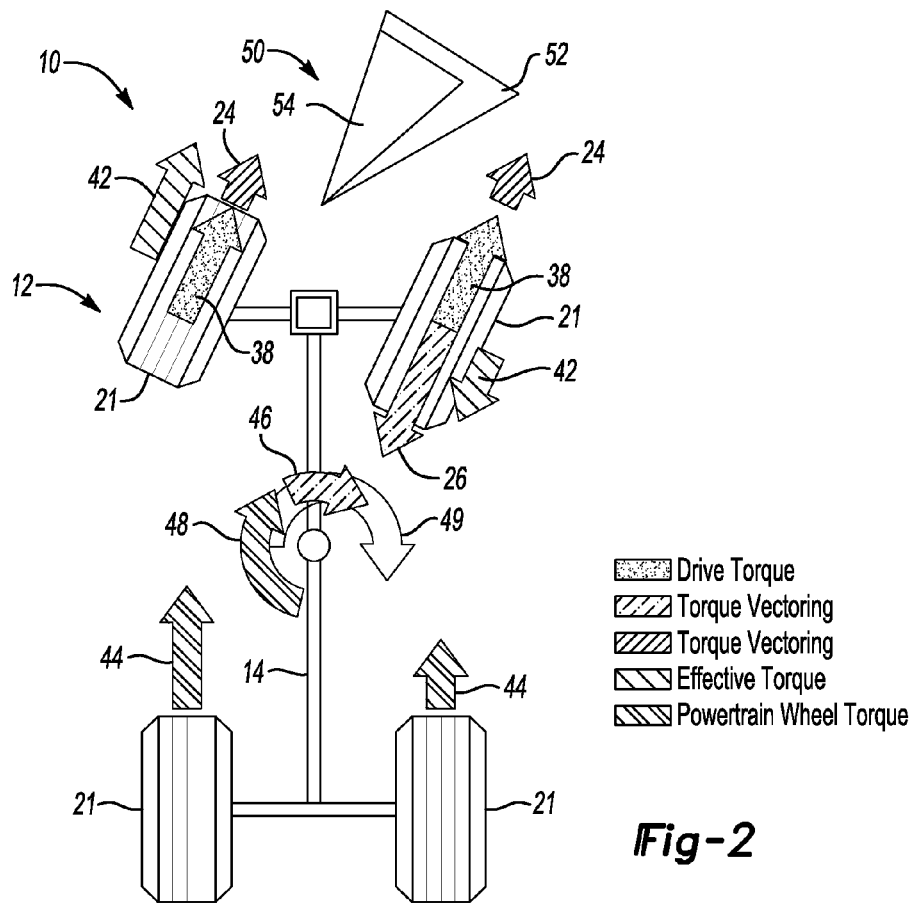
FIG. 2 is a schematic illustration of the steering demand, wheel torques, and resulting vehicle yaw torque for the vehicle having the torque vectoring system of FIG. 1.

Referring to the FIGS. 1 and 2, a vehicle 10 has a torque vectoring system 12. The vehicle 10 also has an all-wheel drive (AWD) powertrain system 14, an electronic braking system (EBS) 16, and a steering system 15. The EBS 16 has a control module 18, which is utilized by the torque vectoring system 12 to apply the wheel torque from the AWD 14 and the EBS 16. The torque vectoring system 12 eliminates complications of separate systems by integrating brake and powertrain-based torque vectoring control in the EBS control module 18, as described in further detail below.

The EBS 16 includes the control module 18 which controls the vehicle brakes 20. Brake control may be split between the front and rear brakes as well as between the left and right sides of the vehicle. Throughout the application the relative directions of forward and rear are in reference to the direction which an operator for the vehicle 10 would primarily be facing while typically operating the vehicle 10. In the example illustrated the vehicle 10 is a primary front wheel drive vehicle 10 having an AWD system. However, the torque vectoring system 12 can also be used with a primary rear wheel drive vehicle 10 having any AWD system. One skilled in the art would be able to determine how to modify the requested torques from the torque vectoring system 12 for application to a primary rear wheel drive vehicle with an AWD system.

The EBS system 16 may vary brake pressure at the individual wheel brakes 20 based upon information provided by various vehicle sensors 22, e.g. wheel speed sensors which detect wheel speed. The torque vectoring system 12 utilizes the EBS control module 18 to request and integrate an AWD powertrain-based torque 44 from the AWD 14 and brake based torque 26. The EBS control module 18 arbitrates the torque requests between brake wheel torque 26 created by the brakes 20 (i.e. modulates brake pressure to create brake torque resulting in a vehicle yaw torque) and AWD powertrain wheel torque 44.

If it is available, the EBS control module 18 utilizes the AWD powertrain wheel torque 44 first. If AWD powertrain wheel torque 44 is not available, the EBS control module 18 applies the brakes 20 to create brake torque 26. If AWD powertrain torque is available but not enough for desired torque vectoring the EBS control module 18 may request a combination of AWD powertrain wheel torque 44 and brake wheel torque 26. A positive powertrain torque 24 may be applied at the same time as the negative brake torque 26 to offset the deceleration effect.

In general AWD powertrain-based torque 44 creates a vehicle yaw torque 48 by applying a differential torque between the inner and outer wheels 21 of the vehicle 10 during a turn. Application of AWD powertrain-based torque vectoring by the torque vectoring system 12 has inherent advantages as it improves NVH by reducing brake actuation and thereby generating less EBS pump run, reducing brake thermal issues as less brake pressure generates less heat and reduces the effect on vehicle longitudinal acceleration by needing less positive engine torque 24 to compensate for torque vectoring brake torque. In general, brake torque 26 creates a vehicle yaw torque 46 on the vehicle 10 by modulating brake pressure at the brakes 20 of the inner or outer wheels 21 of the vehicle 10 during a turn. Brake torque vectoring has inherent advantages because it can apply torque on any axle, including on un-driven axles regardless of powertrain applied torque, such as in off-throttle and no or low power torque applications. The yaw torque 48 created by the AWD system 12 and the yaw torque 46 created by the EBS can be used to correct understeer and oversteer, resulting from an overcorrection due to the understeer, of the vehicle 10.

Figure 3:
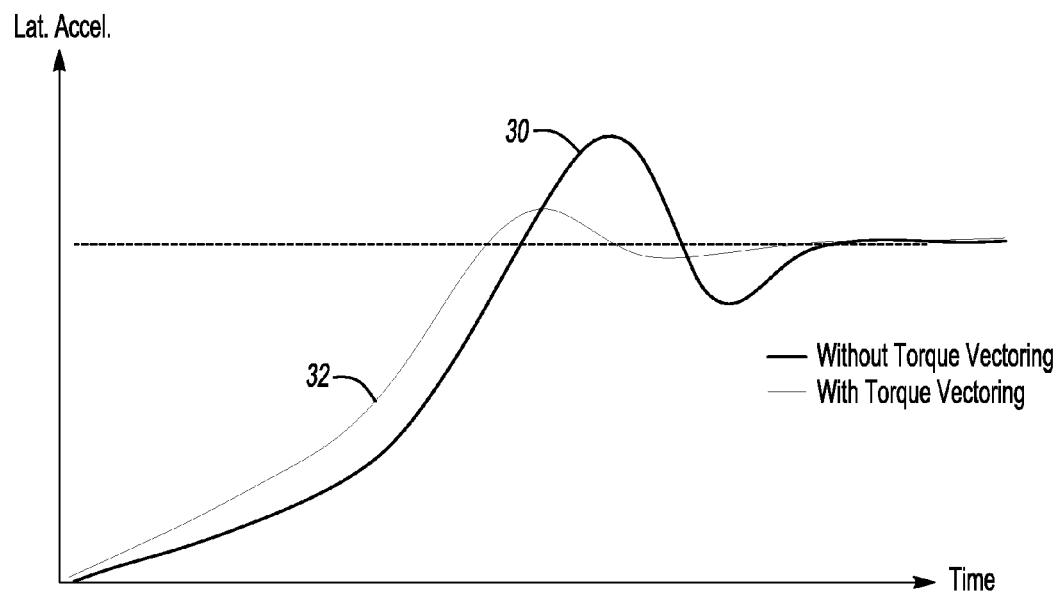
FIG. 3 is a graphical illustration of a vehicle reaction with and without torque vectoring with a given steering demand.

FIG. 3 illustrates a typical vehicle reaction 30 without using torque vectoring and the vehicle reaction 32 using torque vectoring while the vehicle turning is illustrated. FIG. 3 is based on a given steering demand. The vehicle reaction 32, in terms of lateral acceleration, while using torque vectoring 12 is quicker and has less overshoot, potentially oversteer, than without torque vectoring.

Figure 4:
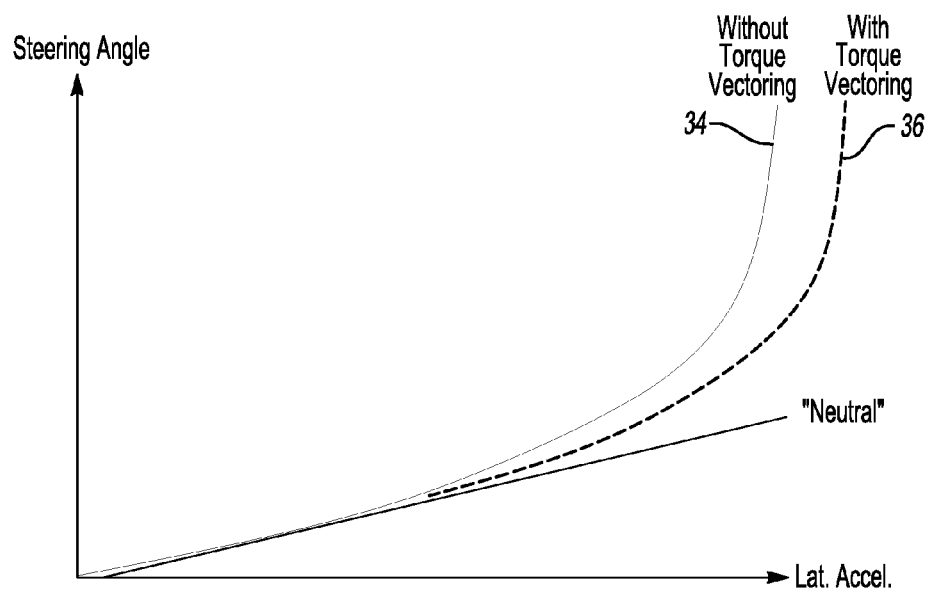
FIG. 4 is a graphical illustration of steering behavior for a vehicle with and without torque vectoring.

FIG. 4 illustrates steering behavior 34 without using torque vectoring and the steering behavior 36 while using torque vectoring, while the vehicle turning is illustrated. As steering demand is increased, torque vectoring produces quicker lateral acceleration response and overall higher lateral acceleration than without torque vectoring.

Referring back to FIGS. 1 and 2, the EBS control module 18 can utilize the advantages of both AWD powertrain torque 44 and brake torque 26 to apply the torque vectoring which is most advantageous for a given driving situation. For example, the vehicle 10 may be turning through a curve, a right-hand turn is illustrated for the purpose of this example. Powertrain drive torque is applied to the driven wheels 21 to drive the vehicle, illustrated by even arrows at 38. The EBS control module 18 requests all or a portion of the available AWD powertrain wheel torque 44 to be applied to the driven wheels.

If the EBS control module 18 determines that further torque vectoring is required, the EBS control module 18 applies a brake torque 26 to the wheels 21, by applying a differential brake pressure at the corresponding brakes 20. An effective torque, illustrated as uneven arrows 42, is created by the combined powertrain torque 38 and 24 and brake torque 26. The torque vectoring system 12 intervention provides a powertrain torque for the vehicle 10, illustrated at 44.

Therefore, the torque vectoring system 12 can recognize vehicle understeer while driving in turns and reduce the understeer by applying brake torque to inner wheels 21. This brake torque application itself creates yaw torque 46 on the vehicle 10 and also transfers applied powertrain torque 38, if available, from inner to outer driven wheels creating the yaw torque 48. Used herein, the term turns indicates vehicle movement where the steering demand is not zero. This torque vectoring brake torque application also results in the reduction of wheel slip, which without intervention by the torque vectoring system 12 can result in unwarranted traction control system and vehicle instability.

The vehicle 10 with torque vectoring system 12 intervention has a total applied vehicle yaw torque, schematically illustrated at 49, over a vehicle without the torque vectoring system 12, and improves vehicle reaction and steering behavior and decreases understeer and oversteer in turns.

The steering demand for the vehicle 10 is also schematically illustrated at 50. The portion 52 schematically illustrates the steering angle input that is demanded on the vehicle 10, without the torque vectoring system 12. The portion 54 schematically illustrates the steering angle input that is demanded on the vehicle 10, with the torque vectoring system 12. Thus, the larger portion 52 illustrates increased input and effort to the steering system (not shown) necessary to offset understeer during turns.

By utilizing the EBS control module 18 the torque vectoring system 12 can integrate the AWD torque 44 and the brake torque 26 into one response that is most effective for given driving conditions. The torque distribution by the torque vectoring system 12 can include distributing the torque, evenly or with a differential between: the axles, left and right sides of the vehicle, the powertrain torque and the brake torque, or any combination thereof. The arbitration of this distribution can vary according to the given driving conditions and desired vehicle performance.

In one embodiment, the torque vectoring system 12 applies powertrain torque 44 to achieve the yaw torque 48. When, if the maximum available powertrain torque 44 is not sufficient to achieve the desired yaw torque 49 then brake torque 26 is applied to achieve an additional yaw torque 46. In an alternate embodiment the torque vectoring system 12 can apply brake torque 26 to the inner wheels 21, then apply or add proportional powertrain torque 44 to the outer wheels, up to the maximum powertrain torque. Followed by applying additional brake torque 26 to the inner wheels if the total desired yaw torque 49 is greater than can be achieved using the maximum available powertrain torque. In addition, applying positive engine torque 24 to offset the negative brake torque 26 deceleration effect. The deceleration effect may vary based on the type of vehicle and the desired behavioral response of the torque vectoring system 12. Therefore, the additional engine torque 24 applied by the control module 18 may or may not be utilized and can be determined for the desired behavioral response. One skilled in the art would be able to determine the desired behavioral response for a given vehicle.

A control system for an AWD vehicle 10 comprises a powertrain system 14 configured to provide a desired torque differential to inner wheels and outer wheels 21 and an EBS 16 configured to apply a differential braking pressure to the inner wheels and the outer wheels 21. An EBS control module 18 controls the differential torque 44 provided by the powertrain system 14 and applies the differential braking torque 26. The differential braking torque 26 is applied for producing a resulting yaw torque 46 to the vehicle 10, when a desired torque 44 is not available from the powertrain system 14. The control module is an EBS control module 18 that directs the brake system 16 and the powertrain system 14 to provide the desired combination of powertrain torque 44 and braking torque 26. The plurality of factors to determine the desired yaw torque for the vehicle include at least one of: wheel speed, vehicle speed, longitudinal acceleration, lateral acceleration, steering angle, brake pressure, yaw rate, and calculated derivatives of these, etc.

One method of generating a desired yaw torque 49 is to determine a desired torque vector. The EBS control module 18 requests a value representing an available torque from the powertrain 14 for the vehicle 10. The EBS control module 18 also determines the desired yaw torque for the vehicle 10 based upon the plurality of factors. The EBS control module 18 determines a first torque 44 and a second torque 26, wherein the first torque 44 and the second torque 26 are combined to provide the desired yaw torque 49 of the vehicle 10. The first torque 44 is generated between wheels of the vehicle 10 by applying torque 44 from the powertrain 14 to different wheels 21 of the vehicle 10 and the second torque 26 is generated by applying different braking torques from a braking system 16 of the vehicle 10. In some instances the first torque 44 is determined by using all of the available torque from the powertrain 14.

The EBS control module 18 for controlling the brake system 16 of the AWD vehicle 10 comprises instructions to generate a yaw torque 48 of the vehicle 10 including determining a desired torque vector 44. The EBS control module 18 requests a value representing an available torque from the powertrain 14 for the vehicle 10. The EBS control module 18 determines the desired yaw torque 49 for the vehicle 10 based upon a plurality of factors. The brake control module 18 determines a first torque 44 and a second torque 26, wherein the first torque 44 and the second torque 26 are combined to provide the desired yaw torque 49 of the vehicle 10. The first torque 44 is generated between wheels of the motor vehicle 10 by applying torque 44 from the powertrain 14 to different wheels 21 of the vehicle 10 and the second torque 26 is generated by applying different braking torque from a braking system 16 of the vehicle 10.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A control system for an all-wheel drive vehicle comprising:
 a powertrain system configured to provide a desired torque differential to inner wheels and outer wheels;
 a brake system configured to apply a differential braking torque to the inner wheels and the outer wheels; and
 a control module controlling the differential torques provided by the powertrain and brake systems, wherein the control module controls the powertrain system to apply a first differential torque to the outer wheels and concurrently controls the brake system to apply a second differential torque to the inner wheels followed by application of a positive powertrain torque to offset deceleration effects from the second different torque applied by the brake system.

2. The control system as recited in claim 1, wherein the differential braking torque is applied for providing a desired yaw torque of the vehicle, when all of the desired yaw torque is not available from the powertrain system.

3. The control system as recited in claim 1, wherein the control module is a brake system control module that directs the brake system and the powertrain system to provide the desired combination of differential powertrain torque and braking torque.

4. The control system as recited in claim 1, wherein a plurality of factors to determine the differential torques includes at least one of: wheel speed, vehicle speed, longitudinal acceleration, lateral acceleration, steering angle, brake pressure, yaw rate, and calculated derivatives of these.

5. The control system as recited in claim 1, wherein the control module applies drive torque from the powertrain to offset the deceleration effect of the braking torque.

6. The control system of claim 1, wherein the control module applies at least a portion of the braking torque prior to applying the powertrain torque.

7. The control system of claim 1, wherein the vehicle is a primary rear wheel drive vehicle.

8. A method of generating a yaw torque in an all-wheel drive vehicle comprising: requesting a value representing an available torque from a powertrain for the vehicle;
 determining a desired yaw torque for the vehicle with a brake control module;
 determining a first torque differential and a second torque differential, wherein the first torque differential and the second torque differential are combined to provide the desired yaw torque of the vehicle;
 generating the first torque differential between wheels of the vehicle by applying torques from a powertrain to different wheels of the vehicle;
 generating the second torque differential between the wheels of the vehicle by applying different braking torques from a braking system of the vehicle;
 applying at least a portion of the braking torque to the inner wheels;
 applying a proportional powertrain torque to the outer wheels;
 applying additional brake torque to the inner wheels if the desired yaw torque is greater than can be achieved using maximum powertrain torque available; and
 applying positive engine torque to offset the negative brake torque deceleration effect.

9. The method as recited in claim 8, wherein determining the first torque differential further comprises using all of the available torque from the powertrain.

10. The method as recited in claim 8, further comprising applying drive torque from the powertrain to offset the deceleration effect of the braking torque.

11. The method as recited in claim 8, further comprising applying at least a portion of the braking torque prior to applying the powertrain torque.

12. A brake control module for controlling a brake system of an all-wheel drive vehicle, the controller comprising instructions to generate a yaw torque in the vehicle comprising:
 requesting a value representing available powertrain torque from a powertrain controller for the vehicle;
 determining a desired yaw torque for the vehicle with a brake control module based upon a plurality of factors;
 determining a first torque differential and a second torque differential, wherein the first torque differential and the second torque differential are combined to provide the desired yaw torque of the vehicle;
 sending a request to the powertrain controller to generate a first torque differential between wheels of the vehicle by applying torques from a powertrain to different wheels of the vehicle;

generating the second torque differential between the wheels of the vehicle by applying different braking torques from a braking system of the vehicle; and applying a third torque from the powertrain to offset deceleration effect of the second torque.

13. The brake module as recited in claim 12, wherein determining the first torque differential further comprises using all of the available torque from the powertrain.

14. The brake module as recited in claim 13, wherein the second torque is applied when the first torque is not sufficient to achieve the desired yaw torque.

15. The brake module as recited in claim 12, wherein a plurality of factors to determine the differential torques includes: wheel speed, vehicle speed, longitudinal acceleration, lateral acceleration, steering angle, brake pressure, yaw rate, and calculated derivatives of these.

16. The brake module as recited in claim 12, further comprising instructions for applying at least a portion of the second torque prior to applying the first torque.

17. The brake module as recited in claim 16, wherein the vehicle is a primary rear wheel drive vehicle.

18. A brake control module for controlling a brake system of an all-wheel drive vehicle, the controller comprising instructions to generate a yaw torque in the vehicle comprising:

requesting a value representing available powertrain torque from a powertrain controller for the vehicle;

determining a desired yaw torque for the vehicle with a brake control module based upon a plurality of factors;

determining a first torque differential and a second torque differential, wherein the first torque differential and the second torque differential are combined to provide the desired yaw torque of the vehicle;

sending a request to the powertrain controller to generate a first torque differential between wheels of the vehicle by applying torque from a powertrain to different wheels of the vehicle;

generation the second torque differential between the wheels of the vehicle by applying different braking torques from a braking system of the vehicle;

applying at least a portion of the second torque to the inner wheels prior to applying the first torque;

applying proportional first torque to the outer wheels;

applying additional second torque to the inner wheels if the desired yaw torque is greater than can be achieved using maximum first torque available; and applying a third torque to offset the deceleration effect.

* * * * *